Patented June 25, 1946

2,402,641

UNITED STATES PATENT OFFICE 2,402,641

PRODUCTION OF ARYL THIOLS

Wilbur A. Lazier, New Castle County, and Frank K. Signaigo, Wilmington, Del., assignors to E. I. du Pont de Nemours & Company, Wilmington, Del., a corporation of Delaware No Drawing. Application October 31, 1940, Serial No. 363,680

14 Claims. (Cl. 260—609)

This invention relates to a process for the production of aryl thiols and, more particularly, to the production of aryl thiols from aryl sulfonic and sulfinic acids and their derivatives.

This application is a continuation-in-part of our copending application Serial No. 289,582 filed August 11, 1939, matured as Patent No. 2,221,804 issued November 19, 1940. In this copending application we described a process for catalytically hydrogenating aromatic compounds containing an oxygen-sulfur group in which the sulfur atom is directly attached to a carbon atom in the aromatic group. By this process a mixture of organic oxygen-free sulfur compounds and hydrocarbons were obtaineld. This invention represented a marked advance in the field of catalysis of sulfonic compounds because prior to said invention such reactions were thought to be impossible. Through further extensive research we have found that under selected conditions it is possible to obtain aryl thiols in high yields to the practical exclusion of aromatic hydrocarbons when catalytically hydrogenating aromatic oxygen-sulfur compounds.

This invention has as its object the preparation of aryl thiols by a new and improved method. Another object is to provide a simple practical catalytic method for preparing aryl thiols from readily accessible materials. Other objects will be apparent from the following description of the invention.

These objects are accomplished by the following invention which comprises catalytically hydrogenating a substance selected from the class consisting of aryl sulfonic acids, sulfinic acids, the thio analogs of said acids, and substances hydrolyzable to the aforementioned acids, at a temperature between 100° and 300° C. The reaction is preferably carried out in the presence of a sulfactive catalyst selected from the class consisting of the base metal sulfide hydrogenation catalysts, and in the presence of hydrogen sulfide. The temperature of carrying out the reaction should be at or near the minimum temperature needed for effecting hydrogenation. This minimum temperature will vary within the range stated depending upon the material being hydrogenated. The presence of hydrogen sulfide has been found to be exceptionally beneficial as it suppresses side reactions and increases the effectiveness of the catalyst.

The exact manner of practicing this invention will vary depending upon the particular compound processes as shown by the following examples. The quantity of materials referred to in these examples is expressed as parts by weight.

Example I

Into a high pressure autoclave there was charged 75 parts of p-toluenesulfonanilide, 100 parts of decalin and 20 parts of a sulfactive catalyst prepared by treating a methanol suspension of finely divided pyrophoric cobalt with hydrogen sulfide at room temperature until no further sulfidation occurs. Hydrogen was then forced into the autoclave to a pressure of about 1500 lbs. per sq. in. and the autoclave was agitated and heated to a temperature of 275° C. at a pressure of 3000 lbs. per sq. in. After four hours heating the autoclave was cooled and the contents were filtered to remove the catalyst. Nitrogen was then blown through the solution to remove the hydrogen sulfide formed and an aliquot of the solution was titrated with standard iodine solution. The amount of iodine absorbed indicated that only traces of thiocresol were formed. By distillation, there was obtained 23 parts of toluene and a higher boiling fraction consisting of a mixture of aniline and the decalin solvent.

The above experiment was repeated using the same reactants and same conditions except that the autoclave was heated to a temperature of 250° C. for 6 hours. On working up the reaction mixture as described in the preceding paragraph, it was found to contain p-thiocresol in an amount equivalent to 35% conversion of the starting material. The p-thiocresol was separated from the other components by treating the mixture with a saturated aqueous solution of lead acetate. The yellow insoluble lead salt of p-thiocresol was then separated by filtration. The p-thiocresol may be isolated in pure form by treating the lead salt with dilute mineral acid and filtering. The product is a white soild melting at 43° C.

By operating in the manner described above, beta-naphthalenesulfonanilide is converted analogously into thio-beta-naphthol.

Example II

Sixty-five parts of sodium p-toluenesulfinate dihydrate and 25 parts of sulfur were charged into a hydrogenation autoclave together with 100 parts of water and 8 parts of cobalt polysulfide catalyst prepared by precipitating an aqueous solution of cobalt chloride with a solution of an equivalent amount of sodium trisulfide. The autoclave was charged with hydrogen to an initial pressure of 500 lbs. per sq. in. and agitated and heated at 175° C. A rapid reaction occurred as evidenced by the decrease in pressure, and additional hydrogen was added from time to time to replace that absorbed, the total pressure being maintained within the range from 500 to 1000 lbs. per sq. in. After 2.5 hours at 175° C. no further pressure drop was observed and the autoclave was heated for an additional hour to insure completion of the reaction. The contents of the cooled autoclave were rinsed out with water, filtered from the catalyst and acidified with dilute sulfuric acid. The acidified mixture was then extracted with ether and the extract was fractionally distilled. After the ether solvent was removed 30 parts of pure p-thiocresol distilled at 67° C. at 7 mm. pressure. The yield was 30% of the theoretical. This hydrogen reduction may be formulated as follows:

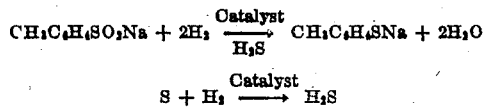

$$S + H_2 \xrightarrow[H_2S]{Catalyst} H_2S$$

The above experiment was repeated under identical conditions except that 6 parts of finely divided pyrophoric iron was substituted for the cobalt polysulfide catalyst. The iron was prepared by extracting the aluminum with boiling caustic alkali from a finely ground alloy of equal weights of iron and aluminum. During the period of heating the autoclave up to reaction temperature the finely divided iron reacted with some of the sulfur forming an active iron sulfide catalyst. The product was isolated as described above and pure p-thiocresol was obtained in 84% yield.

Example III

Sixty-five parts of sodium benzenesulfinate dihydrate was charged into a hydrogenation autoclave together with 20 parts of sulfur, 100 parts of water, and 7 parts of nickel polysulfide catalyst prepared as described under Example II for the cobalt polysulfide catalyst except that an equivalent amount of nickel chloride was substituted for the cobalt chloride. The autoclave was charged with hydrogen to an initial pressure of 1100 lbs. per sq. in. and heated at a temperature of 175° C. for 3.5 hours. Additional hydrogen was added from time to time to replace that absorbed, the total pressure being maintained within the range from 1100 to 2500 lbs. per sq. in. The contents of the cooled autoclave were then filtered from the catalyst and acidified with dilute sulfuric acid. The oil which separated was taken up in benzene and fractionally distilled. After removal of a foreshot of benzene, 30 parts of pure thiophenol distilled at 84° C. at 50 mm. The yield was 90% of the theoretical.

Example IV

Thirty-six parts of 95% beta-naphthalenesulfone chloride was added with stirring to a solution of 21 parts of sodium sulfite in 80 parts of water at 80° C. The solution was maintained just alkaline by the addition of sodium hydroxide as necessary while the reaction mixture was stirred and heated for one-half hour. The crude reaction mixture containing sodium beta-naphthalene-sulfinate was charged into a hydrogenation autoclave together with 12 parts of sulfur and 1 part of iron sulfide catalyst prepared by precipitating ferrous sulfate with sodium polysulfide. The autoclave was charged with hydrogen to an initial pressure of 700 lbs. per sq. in. and heated at 200° C. for 6 hours. The contents of the cooled autoclave were then filtered from the catalyst and acidified with dilute sulfuric acid. The solid thio-beta-naphthol which separated was filtered from the mixture and dried. Analysis of the material indicated it to contain 94% of thio-beta-naphthol. The yield was 21 parts, corresponding to 80% of the theoretical. The formation of thio-beta-naphthol may be formulated as follows:

(1) 
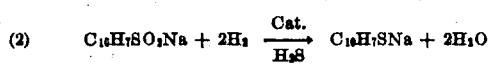

(2) $C_{10}H_7SO_2Na + 2H_2 \xrightarrow[H_2S]{Cat.} C_{10}H_7SNa + 2H_2O$

Example V

Fifty-four parts of phenyl-p-toluenesulfonate was charged into a hydrogenation autoclave together with 15 parts of sulfur, 100 parts of dioxane solvent and 6 parts of molybdenum sulfide catalyst prepared by heating ammonium thiomolybdate at 110° C. Hydrogen was added to an initial pressure of 1000 lbs. per sq. in., and the autoclave was stirred and heated at 250° C. for 6 hours. After this time the autoclave was cooled and the products were filtered from the catalyst and blown with nitrogen to remove the hydrogen sulfide. Titration of an aliquot of the solution with standard iodine solution indicated the presence of 3.7 parts of p-thiocresol. By fractional distillation the p-thiocresol was separated from the solvent, phenol and unconverted starting material. The distillation residue consisted of 45 parts of unconverted phenyl p-toluenesulfonate. The conversion of the ester to the thiol was 12%. The yield, however, based on unrecovered starting material was 83%. The hydrogenation of the sulfonate to thiocresol may be formulated as follows:

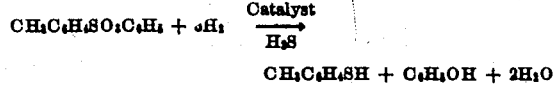

Example VI

Thirty-three parts of crude sodium beta-naphthalenethiosulfonate, prepared by reacting beta-naphthalenesulfone chlorine with sodium sulfide, was charged into a hydrogenation autoclave together with 24 parts of sodium sulfide nonahydrate, 130 parts of water and 7 parts of cobalt sulfide catalyst prepared as described in Example II. The autoclave was charged with hydrogen at superatmospheric pressure and heated at 175° C. under a total pressure of 2500 lbs. per sq. in. for four hours. After this period the autoclave was cooled and the product was filtered from the catalyst, acidified, and extracted with benzene. Evaporation of the benzene yielded a light tan colored solid residue of the thio-beta-naphthol of 87% purity. These reactions may be formulated as follows:

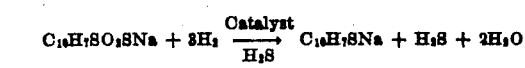

Example VII

Thirty parts of benzenesulfinic acid, 15 parts of sulfur, 40 parts of anhydrous dioxane and 5 parts of a cobalt polysulfide catalyst prepared as described in Example II were charged into an acid-resistant autoclave which was then filled with hydrogen to an initial pressure of about 1000 lbs. per sq. in. The autoclave was agitated and heated at 150° C. for 6 hours. The cooled reaction mixture was then rinsed out with ether, filtered from the catalyst and blown with nitrogen to remove the hydrogen sulfide. Titration of an aliquot of the reaction mixture with standard iodine solution indicated the presence of thiophenol in an amount equivalent to 87% of the theoretical yield. Distillation of the reaction mixture yielded 18 parts of pure thiophenol boiling at 83° C. at 49 mm. This transformation is represented by the following equation:

Example VIII

A mixture of 440 parts of sodium monosulfide nonahydrate, 64 parts of sulfur, and 100 parts of sodium beta-naphthalenesulfonate were fused in an iron pot equipped with an agitator. The temperature was slowly raised during the course of four hours to 350° C. and maintained there for an additional hour. The cooled solid product was dissolved in 300 parts of hot water. The aqueous mixture was then charged into a hydrogenation autoclave together with 36 parts of sulfur, 90 parts of benzene, and 18 parts of finely divided iron prepared by extracting the aluminum with boiling caustic alkali from a finely ground alloy of equal weights of iron and aluminum. The autoclave was charged with hydrogen at superatmospheric pressure and heated at 225° C. for 5 hours. Additional hydrogen was added occasionally to replace that absorbed, the total pressure being maintained within the range from 1800 to 2500 lbs. per sq. in. The cooled reaction mixture was then filtered from the catalyst, acidified with dilute sulfuric acid, and extracted with benzene. Evaporation of the benzene extract yielded a residue consisting of crude solid thionaphthol.

In the foregoing examples the hydrogenation to thiols of certain specific aromatic sulfur-oxygen compounds has been disclosed for purposes of illustration. The process of this invention is not limited to these particular materials, however, but is applicable generally to aromatic sulfinic acids, sulfonic acids and substances hydrolyzable to these acids such as the salts, alkyl or aryl esters, amides, alkyl or aryl substituted amides, anhydrides, and acid halides. In addition to materials of this type, the process of this invention is also applicable to the thio analogs of these materials; i. e., compounds in which one or more of the oxygen atoms in the sulfur-oxygen group have been replaced by sulfur. Compounds of this class include the thiosulfinic acids and substances hydrolyzable to these acids (e. g., $RS_2OH$, $RS_2ONa$) and the thiosulfonic acids and substances hydrolyzable to these acids (e. g., $RS_2O_2H$, $RS_3OH$, $RS_2O_2K$, $RS_2ONHR'$, $RSO_2$—$(S)_x$—$SO_2R$).

The aromatic nuclei of the compounds falling within the scope of this invention may be those of the simple aromatic hydrocarbons such as benzene, toluene, xylene, mesitylene; the polynuclear aromatic hydrocarbons such as naphthalene, anthracene; and the like. In addition to the sulfoacid group, the aromatic ring may also be substituted with other functional groups such as halogen, amino, hydroxyl, carboxyl, nitro, etc.

Although the above examples illustrate certain conditions of operation, it is to be understood that these values may be varied within the scope of this invention since the optimum conditions depend somewhat upon the particular compound treated. In general, the processes of this invention are operable at temperatures ranging from 100° to 300° C. and at pressures ranging from atmospheric to a maximum determined by the practical limitations of the reaction vessel. Usually, however, it is preferred to carry out the reaction at a temperature within the range from 125° to 250° C. when a sulfinic acid, thiosulfinic acid, thiosulfonic acid or a derivative of such acid is being processed and at temperatures ranging from 175° to 300° C. when a sulfonic acid or derivative thereof is being processed. It is especially desirable to operate at the minimum temperature at which reaction will proceed when this is above 200° C. The preferred pressure range is 100 to 4000 lbs./sq. in. and the total pressure should be in excess of the partial pressure of the hydrogen sulfide when same is used.

It has been found that when the above described hydrogenation reaction is carried out in the presence of hydrogen sulfide or materials that yield hydrogen sulfide under the conditions of the reaction such as sulfur, sodium sulfides, and the like, reaction proceeds at a greater rate and frequently at a lower temperature, thereby leading in many cases to increased yields of thiols. Consequently, it is preferred usually to charge hydrogen sulfide or more conveniently elementary sulfur into the autoclave together with the other reactants. The sulfur will be hydrogenated to hydrogen sulfide at an early stage in the reaction. It is possible that the improved results obtained using hydrogen sulfide in the reaction medium are brought about by at least partial substitution of the oxygen atoms in the sulfur-oxygen group by sulfur, thereby forming thiosulfinic or thiosulfonic derivatives. Such compounds apparently undergo hydrogenation more rapidly and at a lower temperature than the corresponding oxygen derivatives. We do not wish, however, to be limited by these considerations.

The process may be carried out in the absence of solvents although more usually it is convenient to use a solvent. Examples of solvents that may be employed are water or organic solvents as, for example, alcohols, ethers, hydrocarbons, and the like. Other materials such as alkalies, mineral or organic carboxylic acids, acid anhydrides, ammonia, or amines may also be present in the reaction media if desired.

The proportion of catalyst may be varied considerably. In general, an amount of catalyst equal to 2 to 15% by weight of the starting material will bring about reaction at a suitable rate. The type of catalyst used may likewise be varied considerably but in general the sulfides or polysulfides of the common hydrogenating metals are effective. As examples of metal sulfide catalysts that may be used are sulfides or polysulfides of copper, silver, lead, maganese, iron, cobalt, nickel, molybdenum, tungsten, or combinations of such sulfides. It is preferred to use as catalysts, sulfides of iron, cobalt, nickel, or molybdenum since these have been found to be especially active for the hydrogenation of aryl sulfur-oxygen compounds. Catalysts of the above type are referred to herein as sulfactive hydrogenation catalysts.

The method of preparation of representative sulfactive catalysts is indicated in the foregoing examples. In general, metal sulfides may be formed by precipitation methods or by sulfidation of the metals or their compounds at ordinary or elevated temperatures by means of sulfur, hydrogen sulfide, or other volatile sulfur compounds. The activity of certain of the metal sulfide catalysts may be improved by treatment with hydrogen at elevated temperatures. The partial or complete hydrogen treatment of the catalyst may be combined conveniently with the use of the catalyst for the hydrogenation reaction. Finely divided metal sulfides may be used as such or they may be supported on suitable carriers such as kieselguhr, magnesia, or alumina.

The catalytic hydrogenation of aromatic sulfur-oxygen compounds can in some cases advantageously be employed in conjunction with chemical reduction methods as has been described in Examples IV, VI and VIII. Hence it is a part of this invention to pre-treat aromatic sulfur-oxygen compounds with chemical reducing agents and to subsequently continue the reduction to the thiol stage by catalytic hydrogenation as disclosed herein. Examples of chemical reducing agents that may be used in this connection are electronegative metals in conjunction with substances having a replaceable hydrogen atom (e. g. Na+alcohol, Zn+alkali); hydrogen sulfide, soluble metal sulfides and polysulfides, sulfur, sulfur dioxide, sulfites, hyposulfites, thiosulfates and the like.

This invention is useful for the preparation of aryl thiols which are valuable products having many industrial uses as, for example, rubber chemicals, insecticides and dyestuff intermediates.

This invention offers many advantages over older processes for preparing aryl thiols. It comprises a novel and effective catalytic hydrogenation process by which aromatic sulfur-oxygen compounds are converted by a single operation into aryl thiols.

It is apparent that many widely different embodiments of this invention may be made without departing from the spirit and scope thereof and therefore it is not intended to be limited except as indicated in the appended claims.

We claim:

1. The process for producing an aryl thiol which comprises catalytically hydrogenating the oxygenated sulfur group of a compound of the class consisting of aryl sulfonic acids, sulfinic acids, the thio analogs of these acids and substances hydrolyzable to said aryl sulfonic and sulfinic acids and their thio analogs, at a temperature between 100° and 300° C.

2. The process for producing an aryl thiol which comprises catalytically hydrogenating in the presence of hydrogen sulfide the oxygenated sulfur group of a compound of the class consisting of aryl sulfonic acids, sulfinic acids, the thio analogs of these acids and substances hydrolyzable to said aryl sulfonic and sulfinic acids and their thio analogs, at a temperature between 100° and 300° C.

3. The process for producing aryl thiols which comprises hydrogenating in the presence of a sulfactive catalyst the oxygenated sulfur group of a compound of the class consisting of aryl sulfonic acids, sulfinic acids, the thio analogs of these acids and substances hydrolyzable to said aryl sulfonic and sulfinic acids and their thio analogs, at a temperature between 100° and 300° C.

4. The process of claim 3 in which the sulfactive catalyst is a base metal sulfide.

5. The process of claim 3 characterized in that the temperature is maintained at about the minimum temperature for effecting the catalytic reaction.

6. The process for producing thionaphthols which comprises hydrogenating the oxygenated sulfur group of compounds of the class consisting of naphthalene sulfonic acids, sulfinic acids, the thio analogs of said acids, and substances hydrolyzable to said aryl sulfonic and sulfinic acids and their thio analogs, in the presence of a base metal sulfide catalyst and at a temperature of between 100° and 300° C.

7. The process for producing an aryl thiol which comprises catalytically hydrogenating in the presence of hydrogen sulfide a salt of an aryl sulfinic acid in the presence of a base metal sulfide catalyst at a temperature of 125° to 250° C.

8. The process for producing an aryl thiol which comprises hydrogenating the oxygenated sulfur group of a compound of the class consisting of aryl sulfonic acids, sulfinic acids, the thio analogs of these acids, and substances hydrolyzable to said aryl sulfonic and sulfinic acids and their thio analogs in the presence of a sulfactive catalyst comprising a sulfide of a metal of the group consisting of iron, cobalt, nickel and molybdenum, at a temperature between 100° and 300° C.

9. The process for producing an aryl thiol which comprises catalytically hydrogenating a substance of the class consisting of aryl thiosulfonic acids, aryl thiosulfinic acids, and substances hydrolyzable to said aryl thiosulfonic and thiosulfinic acids in the presence of a base metal sulfide catalyst, at a temperature between 100° and 300° C.

10. The process of claim 7 in which the salt of an aryl sulfinic acid is a salt of beta-naphthalenesulfinic acid.

11. The process for producing thio-beta-naphthol which comprises reacting beta-naphthalenesulfone chloride with sodium sulfite and sodium hydroxide and thereafter catalytically hydrogenating the reaction product in the presence of hydrogen sulfide and a sulfactive metal sulfide catalyst at a temperature of from 125° to 250° C.

12. The process of claim 11 in which the metal sulfide is an iron sulfide.

13. The process of claim 9 in which the compound hydrogenated is selected from the class of salts of aryl thiosulfonic acids and aryl thiosulfinic acids.

14. The process for producing an aryl thiol which comprises catalytically hydrogenating an aryl sulfinic acid in the presence of hydrogen sulfide and a base metal sulfide catalyst at a temperature of 125° C. to 250° C.

WILBUR A. LAZIER.
FRANK K. SIGNAIGO.